United States Patent
Girard et al.

(10) Patent No.: US 9,482,354 B2
(45) Date of Patent: Nov. 1, 2016

(54) SUPER HIGH FLOW PRESSURE RELIEF VENT

(71) Applicant: GIRARD EQUIPMENT, INC., Vero Beach, FL (US)

(72) Inventors: Timothy P. Girard, Vero Beach, FL (US); Michael Fernandez, Vero Beach, FL (US); John LaFave, Sarasota, FL (US); Glen Harm, Port St. Lucie, FL (US); Joseph Petrarca, Landing, NJ (US)

(73) Assignee: Girard Equipment, Inc., Vero Beach, FL (US)

( * ) Notice: Subject to any disclaimer, the term of this patent is extended or adjusted under 35 U.S.C. 154(b) by 21 days.

(21) Appl. No.: 14/687,432

(22) Filed: Apr. 15, 2015

(65) Prior Publication Data

US 2015/0292637 A1    Oct. 15, 2015

Related U.S. Application Data

(60) Provisional application No. 61/979,739, filed on Apr. 15, 2014.

(51) Int. Cl.
| | |
|---|---|
| *F16K 17/08* | (2006.01) |
| *F16K 17/04* | (2006.01) |
| *B60P 3/22* | (2006.01) |

(52) U.S. Cl.
CPC ............. *F16K 17/044* (2013.01); *B60P 3/2255* (2013.01); *F16K 17/0413* (2013.01); *F16K 17/0486* (2013.01)

(58) Field of Classification Search
CPC ............... B60P 3/2255; F16K 17/044; F16K 17/0486; F16K 17/0413
USPC ................................. 137/535–543.21, 529, 469
See application file for complete search history.

(56) References Cited

U.S. PATENT DOCUMENTS

| | | | |
|---|---|---|---|
| 1,799,288 | A | 4/1931 | Davis, Jr. |
| 2,004,715 | A | 11/1932 | Thwaits |
| 2,214,683 | A | 9/1940 | Spang |
| 2,923,430 | A | 2/1960 | Stengele |
| 3,311,255 | A | 3/1967 | Loveless |

(Continued)

FOREIGN PATENT DOCUMENTS

WO         9939121         8/1999

*Primary Examiner* — Kevin Lee
*Assistant Examiner* — P. Macade Nichols
(74) *Attorney, Agent, or Firm* — Robert L. Wolter; Beusse, Wolter, Sanks & Maire, PLLC

(57) ABSTRACT

A pressure relief valve (100), having: an upper housing (104) defining a housing internal chamber (112) and comprising at least one window (108) between the upper housing chamber and the atmosphere; a lower housing (106) comprising a housing opening (134); a pallet (170) disposed within the housing internal chamber; and a pair of nested springs (116) disposed within the housing internal chamber and configured to bias the pallet toward the lower housing and thereby form a seal (180) between the housing opening and the housing internal chamber. When the pressure in the housing opening is at a full discharge pressure that is greater than and within fourteen percent of the start-to-discharge pressure, the pair of nested springs is configured to permit the pallet to travel a sufficient distance to expose a flow area of the at least one window that is at least greater than a flow area (138) of the housing opening.

20 Claims, 7 Drawing Sheets

(56) References Cited

U.S. PATENT DOCUMENTS

| | | |
|---|---|---|
| 3,447,565 A | 6/1969 | Davis |
| 3,677,286 A | 7/1972 | Wolfson |
| 3,981,325 A | 9/1976 | Robinson et al. |
| 4,009,862 A | 3/1977 | DeFrees |
| 4,109,677 A | 8/1978 | Burnside |
| 4,277,229 A | 7/1981 | Pacht |
| 4,406,299 A | 9/1983 | DeFrees |
| 4,460,805 A | 7/1984 | Johnson |
| 4,493,335 A | 1/1985 | Watson |
| 4,501,377 A | 2/1985 | Palmer, III |
| 4,505,288 A | 3/1985 | Murphy et al. |
| 4,590,959 A | 5/1986 | Fort |
| 4,674,530 A * | 6/1987 | Bickford ................ B65D 90/32 137/469 |
| 4,691,734 A | 9/1987 | Fort |
| 4,706,705 A | 11/1987 | Lee, II |
| 4,709,901 A | 12/1987 | Pierson et al. |
| 4,768,933 A | 9/1988 | Stachowiak |
| 4,854,076 A | 8/1989 | Sieben et al. |
| 4,915,355 A | 4/1990 | Fort |
| 4,920,304 A | 4/1990 | Antonowitz |
| 4,928,726 A | 5/1990 | Johnson et al. |
| 4,934,403 A | 6/1990 | Mooney et al. |
| 5,056,544 A | 10/1991 | Stevens |
| 5,092,963 A | 3/1992 | Barker et al. |
| 5,094,266 A | 3/1992 | Ledbetter |
| 5,105,966 A | 4/1992 | Fort et al. |
| 5,156,374 A | 10/1992 | Fort et al. |
| 5,203,372 A | 4/1993 | Freiler |
| 5,253,712 A | 10/1993 | Swor |
| 5,261,450 A | 11/1993 | Betts |
| 5,299,597 A | 4/1994 | Fort et al. |
| 5,315,066 A | 5/1994 | Spiteri, Sr. |
| 5,523,933 A | 6/1996 | Swanson |
| 5,645,192 A | 7/1997 | Amidzich |
| 5,647,334 A | 7/1997 | Miller |
| 5,855,225 A | 1/1999 | Williams, III |
| 5,918,756 A | 7/1999 | Morgan |
| 5,967,358 A | 10/1999 | Adams et al. |
| 5,972,713 A | 10/1999 | Kuzuhara et al. |
| 6,053,348 A | 4/2000 | Morch |
| 6,095,365 A | 8/2000 | Yielding |
| 6,105,597 A | 8/2000 | Willetts |
| 6,145,530 A | 11/2000 | Fernandez |
| 6,173,854 B1 | 1/2001 | Labelle et al. |
| 6,265,878 B1 | 7/2001 | Traub |
| 6,286,730 B1 | 9/2001 | Amidzich |
| 6,293,051 B1 | 9/2001 | Matye |
| 6,318,402 B1 | 11/2001 | Ladeira |
| 6,352,036 B1 | 3/2002 | Early |
| 6,364,369 B2 | 4/2002 | Bailey |
| 6,561,373 B1 | 5/2003 | Chapin |
| 6,651,696 B2 | 11/2003 | Hope et al. |
| 6,668,853 B2 | 12/2003 | Dean |
| 6,691,683 B2 | 2/2004 | Gracyalny et al. |
| 6,736,162 B2 | 5/2004 | Schimnowski et al. |
| 6,837,266 B2 | 1/2005 | Fredrickson et al. |
| 6,848,466 B2 | 2/2005 | Durand |
| 7,055,440 B2 | 6/2006 | Sisk |
| 7,201,182 B2 | 4/2007 | Eernisse |
| 7,337,796 B2 | 3/2008 | Choate et al. |
| 7,520,297 B2 | 4/2009 | Bell et al. |
| 7,621,292 B2 | 11/2009 | Eernisse |
| 7,658,570 B2 | 2/2010 | Hill et al. |
| 8,047,226 B2 | 11/2011 | Kesner et al. |
| 8,070,009 B2 | 12/2011 | McKenzie et al. |
| 8,171,953 B2 | 5/2012 | Adams et al. |
| 8,316,880 B2 | 11/2012 | Grosskopf et al. |
| 8,616,289 B2 | 12/2013 | Nguyen et al. |
| 2002/0190068 A1 | 12/2002 | Sisk et al. |
| 2008/0078127 A1 | 4/2008 | Hill et al. |
| 2009/0078321 A1 | 3/2009 | Arnott et al. |
| 2009/0145905 A1 | 6/2009 | Kim |
| 2010/0218963 A1 | 9/2010 | Zellweger |

* cited by examiner

SUPER HIGH FLOW PRESSURE RELIEF VENT

CROSS-REFERENCE TO RELATED APPLICATIONS

This application claims the benefit of U.S. Provisional Application No. 61/979,739 filed Apr. 15, 2014, incorporated herein by reference in its entirety.

FIELD OF THE INVENTION

The invention relates to external, reclosing pressure relief devices mounted to railroad tank cars.

BACKGROUND OF THE INVENTION

Railroad tank cars transporting hazardous materials are subject to various regulatory requirements, including a requirement that there be a reclosing, pressure relief device mounted to the tank car. The pressure relief device itself must meet certain requirements. A start to discharge pressure may be defined. This is a pressure at which there is a measurable lift of the closure device on the safety relief valve, or at which discharge becomes continuous. The start-to-discharge pressure is selected based on pressures known to occur during a catastrophic event such as a fire associated with a tank car carrying volatile materials. An example of these materials includes crude oil mixed with ethanol. Upon reaching that start-to-discharge pressure it is assumed that an explosion is imminent and that it would be better to vent the hazardous materials to prevent the explosion.

A full-discharge pressure may also be defined for the device. At the full-discharge pressure the valve must be able to vent at a minimum flow rate. The flow rate at full-discharge pressure may be defined as a minimum flow rate. For example, a minimum full-discharge flow rate may be 27,000 standard cubic feet per minute (scfm). However, greater flow rates are acceptable and preferred. The full-discharge pressure may be within a percentage of the start-to-discharge pressure. For example, the full-discharge pressure may be a pressure that is above the start-to-discharge pressure by approximately ten percent. Under current convention a start-to-discharge pressure may be seventy five psig, and the full-discharge pressure may be ten percent over that, which is 82.5 psig. The full discharge rate may alternately be considered 85 psig, or less than fourteen (14) percent greater than the start-to-discharge pressure.

The industry has traditionally manufactured vent holes in the tank cars to standard dimensions. Conventionally that includes 6.5 inches in diameter. Consequently, a conventional pressure relief valve manufactured for new and retrofit applications must be able to meet the start-to-discharge pressure and full-discharge pressure requirements for an opening of this size. A conventional opening of 6.5 inches will generate approximately 2488 pounds of force at the set-to-discharge pressure of 75 psig, and approximately 2819 pounds at the full-discharge pressure of 85 psig.

Concurrent with these factors is a requirement that external fixtures which are mounted to a top of the tank car must not extend too far past the tank car outer wall. Specifically, under current conventions, the pressure relief device may not extend more than twelve inches above the tank car surface. This ensures that the tank car and pressure relief valve fit into any tunnel the train may travel through.

The result of the above factors, inter alia, is that the pressure relief devices are being asked to resist relatively high forces associated with the start-to-discharge pressure and size of the tank car opening until the start-to-discharge pressure is met, and above this pressure the pressure relief valve is being asked to yield quickly to a relatively small increase in force associated with a relatively small increase in pressure. The pressure relief valves are expected to operate with essentially 100% reliability, and thus the design must be simple, and all of this must occur in a device that is no taller than twelve inches.

One example of a conventional pressure relief valve 10 is shown in FIG. 1 and described as prior art in FIG. 1 of U.S. Pat. No. 5,203,372 to Freiler, which is incorporated by reference in its entirety herein. The pressure relief valve 10 includes a housing 12 having an upper housing 14, a lower housing 16 having an opening 18 centered over an opening 20 in a tank car wall 22, and a spring assembly 24 and a pallet 26 positioned in a housing internal chamber 28. (Only the right side of the pallet 26 is shown.) At the start-to-discharge pressure a start-to-discharge force 30 is created, which approximately equals a force 32 the spring assembly 24 exerts on the pallet 26 when the pallet 26 is in the sealing position shown. At full-discharge a full discharge force is created which moves the pallet 26 upward into a full discharge position 34, shown in dashed lines. A distance between the sealing position and the full discharge position 34 defines a length of a stroke 36 of the pallet 26.

Gases are then free to escape through a vent path 38. In the vent path 38 the gases first flow upward in an upward portion 40 of the vent path 38, through the opening 20 in the tank car wall 22. The pallet 26 prevents the gases from continuing to flow upward, so they redirect laterally and follow in a lateral portion 42 of the flow path 38, eventually escaping through an opening 44 or several openings in a side 46 of the upper housing 14.

The set-to-discharge force present on the pallet requires a substantial spring or pair of springs such as an outer spring 48 and an inner spring 50 to hold the pallet in the sealing position. Such springs would typically have a very high spring rate, which is essentially a measure of the amount of force necessary to change the spring a given amount of length. For example, the outer spring 48 of FIG. 1 has been implemented as a ⅝ inch spring, while the inner spring 50 has been implemented as a ½ inch spring. Springs with a suitable spring rate would not likely move far as a result of the relatively small change in pressure between the start-to-discharge pressure and the full discharge pressure. Specifically, a height 52 of the lateral portion 42 is limited by the stroke 36 of the pallet 26. Consequently, any flow path through the pressure relief vent would be limited in height by this dimension. The more limited the height of a flow path, the less flow area that is available to the escaping gases. Reduced flow area means increased friction which, in turn, reduces the flow rate. In addition, because the escaping gases must redirect laterally, when the stroke is relatively small, the lateral redirection is more. In fluid dynamics, turns (lateral redirections) add friction and slow the flow, further reducing the flow rate.

To address this, the prior art pressure relief valve 10 includes a lip 60 at an outer perimeter 62 of the pallet 26. The lip 60 forms a ramp 64 that is effective to redirect laterally flowing gases downward. Directing the flow downward produces a reactive upward force on the pallet 26 which pushes the pallet farther upward, thereby increasing the height 52 and hence flow area available to the escaping gases flowing in the lateral portion 42. In one configuration a height of the ramp 64 has been embodied as 0.375 inches.

To maximize the reactive force, the lip 60 is disposed as close to the perimeter 62 as possible. Further, a diameter of the pallet 26 is extended past that necessary to form the seal. Specifically, a seal 70 in the lower housing 16 contacts a seal location 72 on the pallet 26. Instead of forming the ramp 64 immediately radially outside of the seal location 72, the ramp 64 is moved farther radially outward by a radial increase 74. This increases a surface area of the ramp 64. The increased surface area produces an increased reactive force, thereby increasing the lifting of the pallet 26 associated with the ramp 64, producing at least the necessary full-discharge flow rate.

This reactive force concept was taken further as the subject of U.S. Pat. No. 5,203,372 to Freiler, which significantly increases the downward skirt when compared to the ramp 64. This design enables a relatively high discharge coefficient of 0.80. However, since the full-discharge flow rate requirement is a minimum requirement, there remains room in the art for improvement.

BRIEF DESCRIPTION OF THE DRAWINGS

The invention is explained in the following description in view of the drawings that show.

DETAILED DESCRIPTION OF THE INVENTION

Figure 1:
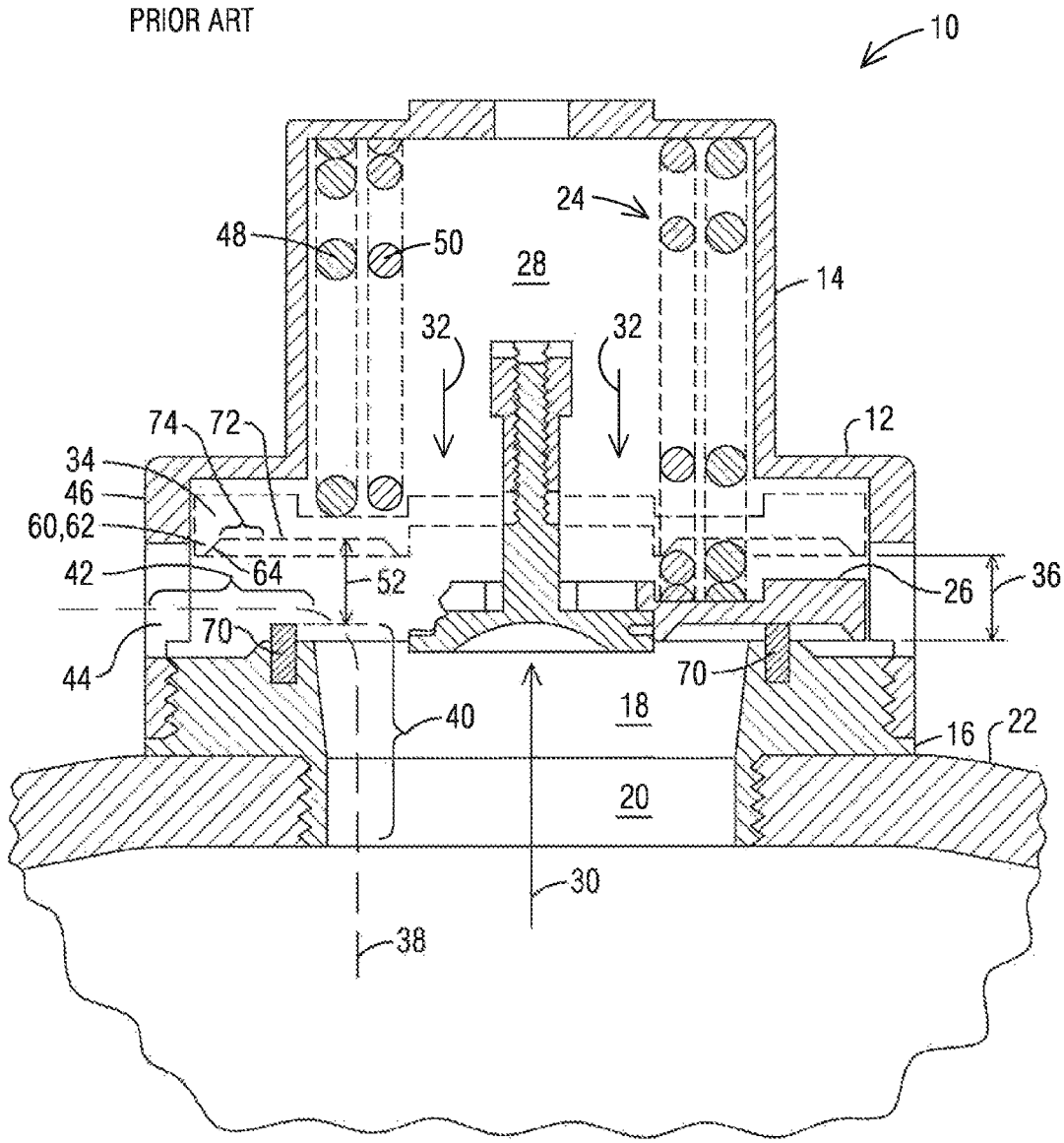
FIG. 1 shows a prior art pressure relief valve.

The present inventors have devised an innovative pressure relief valve by taking an unconventional approach. The prior art that takes advantage of the essentially unregulated width available to create a reactive force that helps move the pallet enough to create a vent path of sufficient flow path area to meet minimum vent requirements. The inventors have recognized a relationship between friction created by this relatively wide vent flow path and the stroke of the pallet. Specifically, the inventors have recognized that friction in the vent flow path is more greatly impacted by turns than previously recognized, including the turn from vertical travel to lateral travel, as well as a downward turn by the ramp meant to generate the reactive upward forces on the pallet. Thus, against convention, the inventors have chosen to forego solutions that create longer lateral portions of flow paths to aid pallet stroke and have instead worked to increase an amount of distance the pallet travels by focusing on the springs. This was done in an effort to reduce friction associated with longer lateral portions of prior art vent paths. Since this travel is vertical, since the height is a restricted dimension, and since it was thought that the springs were already utilizing most, if not all of the available height-space available, it was unconventional for the inventors to look to the springs for a solution.

The inventors were able to design a spring arrangement that improves vertical movement by focusing on spring design. The improved spring design makes it possible for the pallet to move farther. This makes the reactive forces associated with the ramp optional. Without the need for reactive forces to hold the pallet open, the ramp itself is made less important or optional and its radial location may be varied or it may be dispensed with entirely. In the former instance, moving the ramp radially closer to the seal reduces the reactive forces it generates due to the resulting smaller size of the ramp, but this may be acceptable because the better spring design reduces a need for the larger reactive forces of the larger ramp. Moving the ramp radially inward enables a reduced length of the lateral portion of the vent flow path. As a result, escaping gases have a shorter lateral portion to endure, and with the opening to the atmosphere moved closer to the opening in the tank car, less lateral redirection of the escaping gases is required. Consequently, friction associated with the length of the lateral portion is reduced, as is friction associated with turning, and this reduced friction drastically increases the flow rate. In the latter case, where there is no reactive force, the stroke may be slightly less, but the flow rate is still sufficiently greater than the prior art. Thus, by increasing the stroke and shortening the lateral portion of the vent flow path, the inventors have created a pressure relief valve that achieves a discharge coefficient of up to 0.95 which, to the knowledge of the inventors, is previously unmet.

Figure 2:
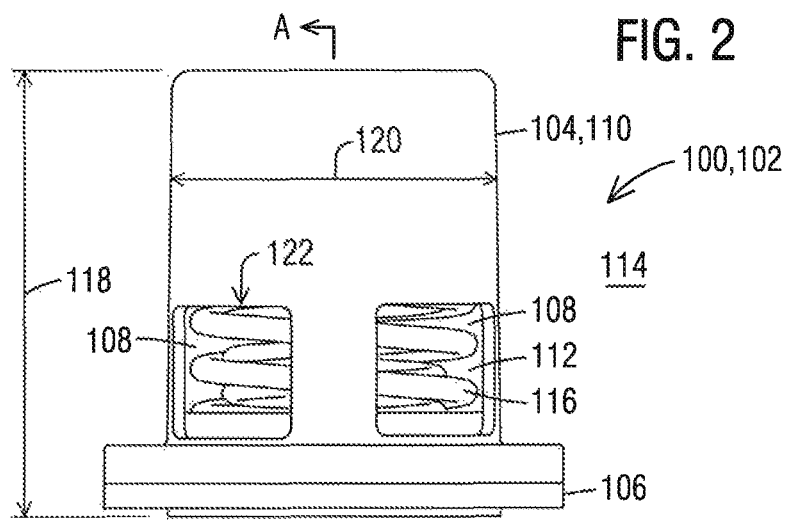
FIG. 2 shows a side view of an exemplary embodiment of the pressure relief valve disclosed herein.

FIG. 2 shows a side view of an exemplary embodiment of the pressure relief valve 100 disclosed herein, which includes a housing 102 having an upper housing 104, a lower housing 106, a window 108 through a housing wall 110 of the upper housing 104 and providing fluid communication between an internal chamber 112 and the atmosphere 114, and a biasing arrangement 116 disposed in the housing internal chamber 112. There may be one or several windows 108 and they may be spaced evenly around a circumference of the upper housing 104 or otherwise distributed as desired. The pressure relief valve 100 has a height 118 and in an exemplary embodiment the height 118 may be not greater than twelve inches. In the exemplary embodiment shown the upper housing 104 has a cylindrical shape and a diameter 120. This diameter 120 defines an arcuate vent path exit 122 and an arcuate flow area of the arcuate vent path exit 122. The lower housing 106 is configured to be secured over a vent hole (not shown) of a rail tank car. The housing wall 110 is straight along the entire upper housing 104. Consequently, stress transferred to the upper housing 104 from the biasing arrangement 116 has a straight load along the housing wall 110. This increases a service life of the valve and reduces the chances that the housing wall 110 will change shape when compared to a wall of the prior art upper housing 14, which contains two ninety (90) degree turns in the load path.

Figure 3:
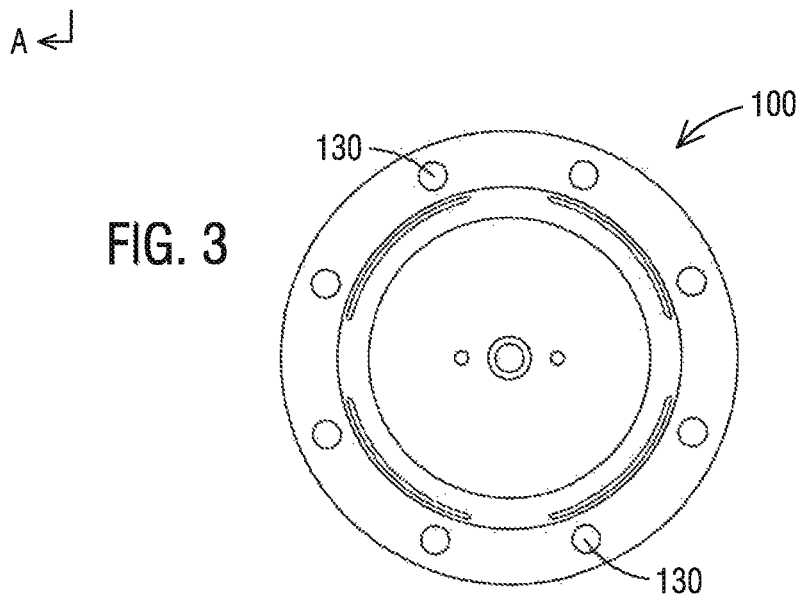
FIG. 3 shows a top view of the pressure relief valve of FIG. 2.
Figure 4:
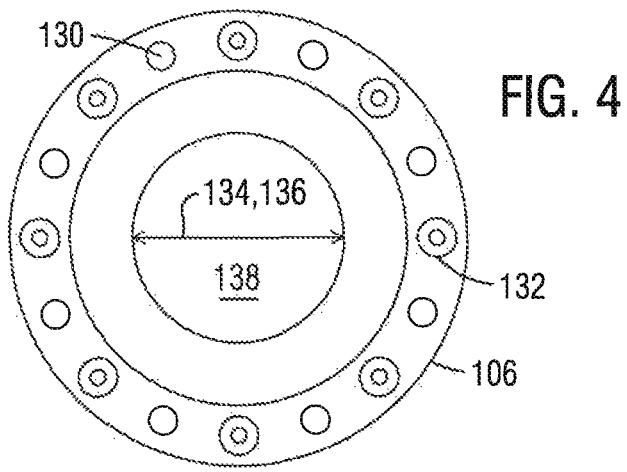
FIG. 4 shows a bottom view of the pressure relief valve of FIG. 2.

FIG. 3 shows a top view of the pressure relief valve 100. In this exemplary embodiment the lower housing 106 includes mounting holes 130 through which studs (not shown) secured to the tank car may extend. The pressure relief valve 100 may be lowered onto the studs and nuts or other suitable fasteners may be used to secure the pressure relief valve 100 in place. FIG. 4 shows a bottom view of the pressure relief valve 100. Visible in this exemplary embodiment are the mounting holes 130 through the lower housing 106, as well as fasteners 132 that secure the lower housing 106 to the upper housing 104, and a housing opening 134 having a housing opening diameter 136 and a housing opening flow area 138. In an exemplary embodiment a value of the housing opening diameter is 5.5 inches, resulting in a housing opening flow area of 24.05 $in^2$, which is the cross sectional area defined by the housing opening 134.

Figure 5:
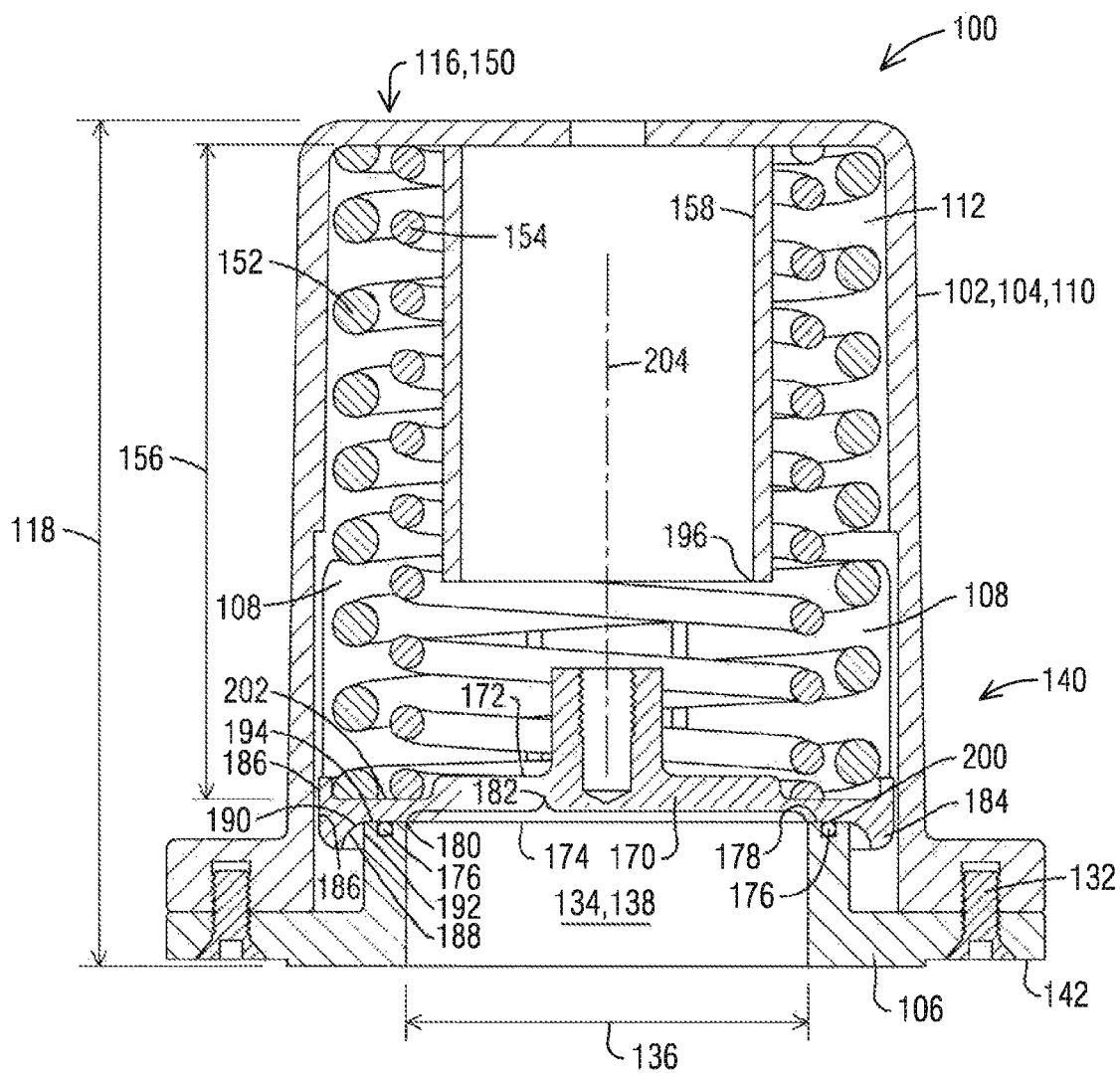
FIG. 5 shows a side cross section of the pressure relief valve of FIG. 2 along line A-A when the pallet is in a closed position.

FIG. 5 shows a side cross section of the pressure relief valve 100 along line A-A from FIG. 2, in a closed position 140. In this exemplary embodiment the biasing arrangement 116 includes a pair of nested springs 150 including an outer spring 152 and an inner spring 154 which may be coil springs or any other type of suitable resilient member. The springs may be coiled in the same direction as each other, or may be coiled in opposite directions. In this exemplary embodiment the biasing arrangement 116 is supported laterally on an outer side by the housing wall 110 of the upper housing 104 along an entire length 156 of the biasing arrangement 116 when the biasing arrangement 116 is fully extended, meaning that the pressure relief valve 100 is in the closed position 140. Lateral support is not necessarily limited to physical contact but includes arrangement where the housing wall 110 prevents more buckling of the biasing arrangement 116, in particular, where it prevents buckling of an outer spring 152 due to the outer spring 152 being compressed.

In this exemplary embodiment the biasing arrangement 116 is supported laterally in an inner side by an alignment device 158, which extends only a portion of the entire length 156 of the biasing arrangement 116 when fully extended in order to account for compression of the biasing arrangement 116 when the pressure relief valve opens.

The biasing arrangement 116 is configured to bias a pallet 170 into the closed position 140 by pressing on an inner chamber side 172 of the pallet 170. This presses a sealing side 174 of the pallet 170 onto a gasket 176 disposed between sealing side 174 of the pallet 170 and an upper surface 178 of the lower housing 106. When so biased, a seal 180 is formed between the housing opening 134 and the housing internal chamber 112.

This seal 180 must remain vapor tight up to a vapor tight pressure in the housing opening 134. In an exemplary embodiment the vapor tight pressure is sixty (60) psig. This seal 180 must also prevent any appreciate flow until a set-to-discharge pressure is met, (i.e. below the set-to-discharge pressure). In an exemplary embodiment the set-to-discharge pressure is seventy five (75) psig. When a pressure in the housing opening 134 reaches a full discharge pressure the seal 180 must be completely released and a minimum flow rate must be achieved. In an exemplary embodiment a minimum full-discharge pressure is ten (10) percent over seventy five (75) psig, or 82.5 psig, and a minimum full discharge rate is 27,000 scfm. In another exemplary embodiment the minimum full-discharge pressure is eighty five (85) psig. Due to manufacturing tolerances, atmospheric conditions, and system dynamics, these values are nominal values and subject to a reasonable industry tolerance of at least +/− three psi.

Using the above parameters, and assuming (for sake of explanation) a surface 182 of the sealing side 174 of the pallet 170 that is exposed to the sixty (60) psig is equal to the housing opening flow area 138, then the exposed surface 182 would experience 1424 pounds of force. Consequently, the biasing arrangement 116 would need to be able to exert sufficient force on the pallet 170 to overcome the 1424 pounds by enough to maintain a vapor tight seal 180. At the set-to-discharge pressure of seventy five (75) psig the exposed surface 182 would experience at least 1780 pounds of force. Consequently, the biasing arrangement 116 would need to be able to exert sufficient force on the pallet 170 to overcome the 1780 pounds of force before permitting measurable lift of the pallet 170 or permitting continuous discharge. At the minimum full discharge pressure of 82.5 psig the exposed surface 182 would experience at least 1958 pounds of force. At a full discharge pressure of 85 psig the exposed surface 182 would experience at least 2018 pounds of force.

To meet minimum flow requirements at 82.5 psig, the biasing arrangement 116 would need to have yielded enough to permit at least 27,000 scfm of flow after experiencing an increase in force of (1958-1780=) 178 pounds. Thus, the biasing arrangement 116 would need to resist movement until a relatively large force of 1780 pounds is experienced, but must yield sufficiently to provide a vent path of sufficient flow area after experiencing a mere 178 pounds of additional force at 82.5 psig. To meet minimum flow requirements at 85 psig, the biasing arrangement 116 would need to have yielded enough to permit 27,000 scfm of flow after experiencing an increase in force of (2018-1780=) 238 pounds. These forces represent minimum forces the biasing arrangement 116 must accommodate. Forces may be greater where an area of the exposed surface 182 is greater than the housing opening flow area 138. In those instances the forces will vary somewhat, but the same principles apply.

In an exemplary embodiment, not meant to be limiting, the inventors devised a configuration of the outer spring 152 and the inner spring 154 effective to produce flow rates above the minimum flow rates required at the full discharge pressure of 85 psig. The springs permitted a greater stroke length range of up to 1.60 to 1.63 inches and as a result the pressure relief valve is able to reach a discharge coefficient of 0.93 to 0.95. As certified by the Colorado Engineering Experiment Station Inc., on Jan. 31, 2014, the following results were achieved and documented in the Certificate of Calibration (traceable to the National Institute of Standards and Technology), CEESI data file 14GIRD-0001_1, Job number CE19651:

|  | Run #1 | Run #2 |
| --- | --- | --- |
| SCFM | 40548 | 40489 |
| Temperature | 469.04 | 467.55 |
| Pressure | 85.053 | 85.521 |
| Baro | 12.034 | 12.034 |

The test specifics include: inlet diameter=twelve inches; test gas=air at standard density=0.074896 $lbm/ft^3$ at standard conditions of 529.67° Rankine, and 14.696 Psia; SCFM=mass flowrate at meter body, standard cfm; Temperature=inlet temperature, degrees Rankine; Pressure=static pressure at valve inlet, psig; and Baro=CEESI barometric pressure, psi. SCFM, Temp, Press, and Baro all at 95% confidence. The pressure relief valve 100 disclosed herein attains discharge coefficients of 0.93-0.95. The prior art pressure relief valve 10 of FIG. 1 might generate a discharge coefficient of up to only 0.87. Consequently, the superior flow rates of the pressure relief valve 100 disclosed herein are proven, and represent a significant improvement over the existing art.

In addition, the improved spring design permits enough room that the springs can compress fully such that they are resting against the bottom end 196 of the alignment device 158 while still having room between the coils. In the prior art device the springs were permitted to reach a solid condition, where no space remained between coils. Allowing a spring to compress past a certain point may permanently deform the spring. The exemplary embodiment disclosed herein avoids this. In an exemplary embodiment the bottom end 196 of the alignment device 158 is positioned to prevent permanent physical deformation of the springs regardless of the amount of pressure acting on the pallet 170.

In addition, most springs that are considered to have a linear spring constant actually have a spring response curve that is essentially linear as the spring is compressed up to a point. Such a spring has a linear spring response within a certain range of spring positions. When compressed beyond this point the spring may begin to exhibit a spring response curve that increases nonlinearly. Accordingly, further compression of the spring requires a corresponding nonlinear increase in force. In such a configuration, it takes nonlinear increases in force on the pallet 170 for the pallet 170 to reach its fully open position. This nonlinear force/pressure curve increases the maximum pressure needed to fully open the prior art pressure relief valve. This necessarily restricts the flow through the prior art pressure relive valve at less than maximum pressures.

In an exemplary embodiment the springs are configured to operate within the linear range of their spring response curve from the fully closed position 140 to a fully open position. Keeping the springs within their linear spring response range from the fully closed position 140 to the fully open position eliminates the nonlinear force/pressure curve during operation. As a result, the maximum pressure is reached sooner, and so the maximum flow rate is achieved at a lower pressure than in a pressure relief valve having a nonlinear force/pressure curve. In an exemplary embodiment, the bottom end 196 of the alignment device 158 is configured to contact the inner chamber side 172 of the pallet 170 when the pallet 170 is in the fully open position or at a location above the fully open position but where the springs are still within their linear spring response range. This prevents the springs from physical damage and yet permits them to compress as much as possible for the available pressures, thereby creating the greatest flow area for a given pressure.

In this exemplary embodiment a lip 184 is present proximate an outer perimeter 186 of the pallet 170 and forms an optional ramp 188 that can generate reactive forces evenly around the perimeter of the pallet 170. This upward force helps lift the pallet 170 and the even spreading of the force around the perimeter helps compensate for any uneven application of spring force on the inner chamber side 172 of the pallet 170. In this exemplary embodiment the ramp 188 is disposed as close as is physically possible to the seal 180. Specifically, a beginning 190 of the ramp is located immediately radially outside of any obstacles, such as an outer perimeter 192 of a gasket surface 194. In an exemplary embodiment, the exposed surface 182 is that portion of the exposed surface 174 up to a sealing area 200, where a diameter of the sealing area is 6.27 inches. A diameter of the perimeter 186 is 8.1 inches. Hence, there may be a ratio of the diameter of the perimeter 186 to the diameter of the sealing area 200 of 1.3 or less. Maintaining this ratio or similar reduces a distance the escaping gases must travel laterally before reaching the atmosphere.

A bottom end 196 of the alignment device 158 may serve as a positive stop for an upper end of the travel/stroke of the pallet 170. The gasket 176 rests against the sealing area 200 on the inner chamber side 172, which is on an opposite side of the pallet 170 than the sealing side 174. The sealing area 200 is annular shaped in this exemplary embodiment, but may take any shape desired. In this exemplary embodiment the outer spring rests radially outward of the gasket 176, and hence, radially outward of the sealing area 200, in a pallet seat 202. Being positioned so close to the perimeter 186 allows the biasing arrangement 116 to stabilize the pallet 170 so that the pallet 170 does not tilt and get stuck. Stated another way, the positioning helps ensure that the pallet 170 does not rotate out of its proper alignment with an axis of travel 204.

In this exemplary embodiment it can be seen that the pressure relief valve 100 is also constructed in a tamper-resistant manner. The fasteners 132 are exposed on a tanker-side 142 of the lower housing 106. When the pressure relief valve 100 is lowered onto the tanker, the fasteners abut the tanker car and become completely inaccessible. Further, the upper housing 104 is of one-piece construction, as opposed to certain prior art configurations where the top of the housing may be threaded onto a remainder of the housing. Consequently, an installed pressure relief valve 100 cannot be dismantled. This reduces concerns about the pressure relief valve 100 being tampered with in a manner that prevents it from providing its safety function. This also eliminates concerns associated with disassembly of the pressure relief valve 100. Specifically, when in the closed position the springs still exert considerable force on the pallet 170. This force may be well over 1000 pounds. Releasing this force represents a considerable risk to someone who may attempt to dismantle the pressure relief valve without the requisite knowledge and understanding of how to do so safely.

Figure 6:
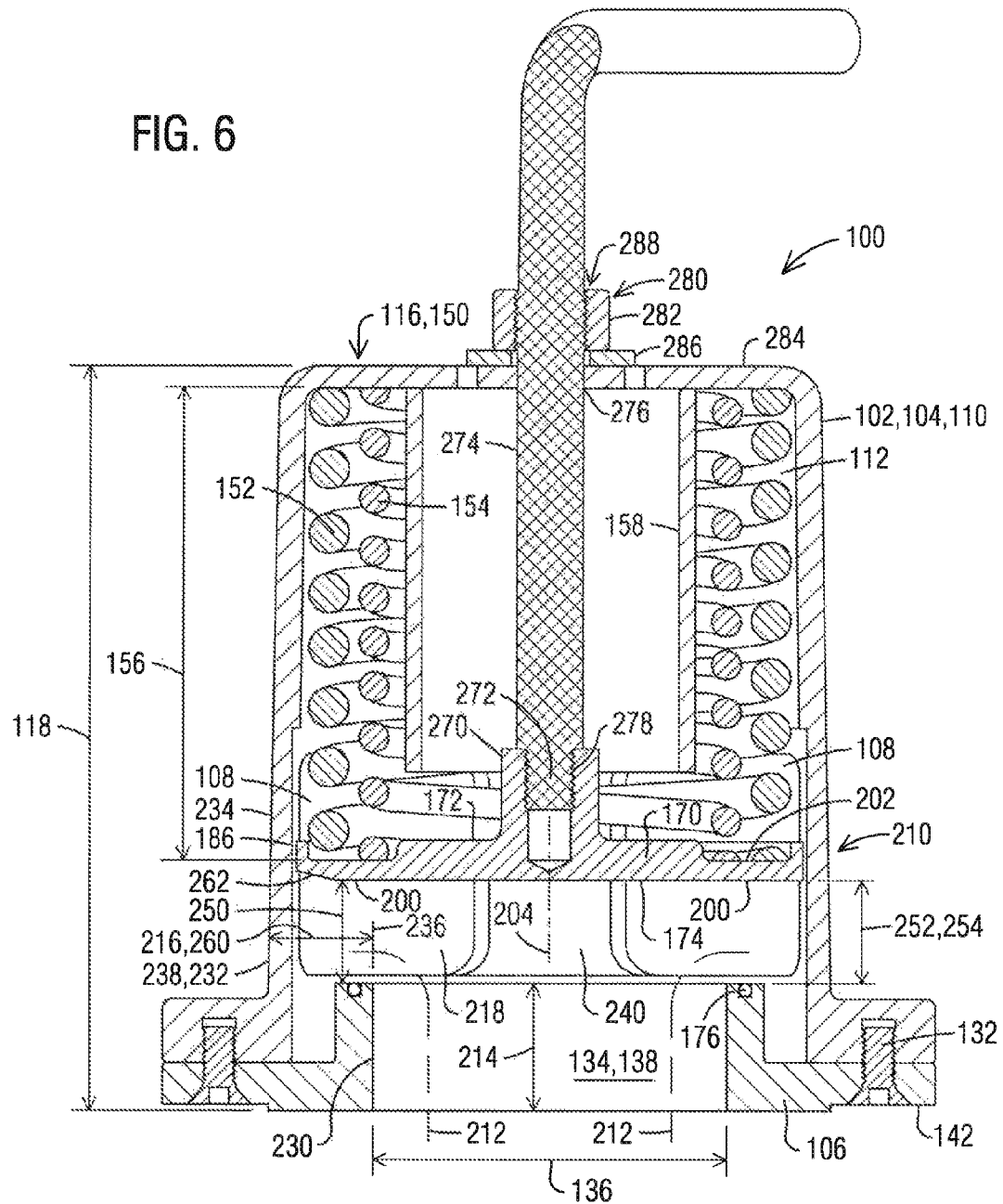
FIG. 6 shows a side cross section of the pressure relief valve of FIG. 2 along line A-A when the pallet is in an open position.

FIG. 6 shows a side cross section of the pressure relief valve 100 along line A-A, in an open position 210. During operation the open position 210 can result from pressure lifting the pallet 170. During maintenance operations the open position 210 can result from a tool lifting the pallet. Thus, while the tool is shown in FIG. 6 and described later, when describing the open position 210 resulting from operation, the tool would not be present but the pallet 170 would be in the same open position 210. For explanation purposes this will be taken as occurring at a full discharge pressure of 85 psig. In this full discharge open position 210 a vent flow path 212 is created, which includes a vertical portion 214, a lateral portion 216, and an intermediate portion 218 between the vertical portion 214 and the lateral portion 216. The lateral portion 216 spans from a perimeter 230 of the housing opening 134 to a cylindrical perimeter 232 defined by an outer surface 234 of the upper housing 104, where the lateral portion 216 ends at the arcuate vent path exit 122 to the atmosphere. Consequently, a flow area of the arcuate vent path exit 122 is defined by a width of the window(s) 108 multiplied by the height of the lateral portion 216 leading to the window(s) 108. In the case of a cylindrically shaped housing 102, the width of the window 108 would be an arc length of the window 108. Accordingly, the arcuate vent path exit 122 would have a shape that resembles a shape of the windows 108. Other shapes than cylindrical may be used, and the perimeter would be considered a shape the outer surface 234 of the upper housing 104 would take were the windows 108 not present. Accordingly, if the vent path exit 122 is not arcuate shaped, the width of the vent path exit 122 may not be an arc length of the window 108, but may be another appropriate dimension that takes into account the shape of the housing 102.

Thus, the lateral portion 216 in this exemplary embodiment is essentially annular in shape with a smooth, continuous inner diameter 236 and an outer diameter 238 that is interrupted circumferentially by portions 240 of the housing wall 110 disposed between the windows 108. The lateral portion 216 has a lateral portion height 250 defined by the sealing side 174 of the pallet 170. Therefore, a stroke length 252 of a stroke 254 of the pallet 170 equals the lateral portion height 250. Consequently, since a flow area of the lateral portion 216 is directly dependent on the lateral portion height 250, the flow area of the lateral portion 216 is directly dependent on the stroke length 252. The inventors have been able to produce a stroke 254 range during operation of 1.60 to 1.63 inches in an exemplary embodiment, and hence the lateral portion height 250 in that exemplary embodiment is up to 1.63 inches. This is not meant to be limiting, and other heights can be used, depending on the design goals.

With the freedom to move the perimeter 186 of the pallet 170 radially inward toward the axis of travel 204, the outer surface 234 of the upper housing 104 may also be moved radially inward. As a result, the outer diameter 238 of the lateral portion 216, which is also the same place where the vent flow path 212 ends and the atmosphere begins, is much closer to the perimeter 230 of the housing opening 134. Consequently, a length 260 of the lateral portion is shortened when compared to the prior art. Specifically, the lateral portion length 260 is not greater than forty percent of the housing opening diameter 136, or not more than 2.2 inches. More specifically, the lateral portion length 260 may be not greater than twenty five percent of the housing opening diameter 126, or 1.38 inches. In an exemplary embodiment a diameter of a circumference defined by the outer surface 234 of the upper housing 104 is 8.57 inches.

With the lateral portion height 250 being approximately 1.6 inches and the lateral portion length 260 being approximately 1.51 inches as well, there can be essentially a 1.6:1.51 ratio (1.06:1) of the lateral portion height 250 to the lateral portion length 260 in one exemplary embodiment. In this exemplary embodiment a stroke length of approximately 1.39 inches would form a vent flow path 212 that formed a flow area equal to that of the housing opening flow area 138. Thus, in this exemplary embodiment, with a stroke of at least 1.6 inches, the flow area created is over fifteen (15) percent greater than the housing opening flow area 138. The greater flow area reduces friction losses. As a result of this increased large head room in the upward direction, escaping gases traveling vertically out of the vertical portion 214 must be redirected laterally somewhat, but a larger portion of the escaping gas will already be vented to the atmosphere before being turned as much as in the prior art. This reduced amount of turning results in reduced friction losses from turning. These friction reductions, together with the friction reduction associated with having a shorter vent flow path lateral portion 216, work together to enable the increased flow rate and discharge coefficient of up to 0.95. Ratios of lateral portion height 250 to the lateral portion length 260 greater than 0.92:1 (minimum stroke of 1.39 inches to lateral length of 1.51 inches) are envisioned and considered to be within the scope of the disclosure.

A sixteen (16) percent greater vent path flow area provides a flow rate of over 40,000 scfm at 85 psig in the exemplary embodiment of FIG. 5 detailed above. The associated discharge coefficient is 0.93 to 0.95, which is substantially above that achieved by the prior art. The inventors have determined that increasing the vent path flow area through the outer surface 234 of the housing so that it is at least greater than the housing opening flow area 138 provides greatly improved results. Using the exemplary embodiment described above, with a housing opening flow area 138 of 24.05 in$^2$, the flow area of the outer diameter 238 of the lateral portion 216, when sixteen (16) percent greater, is 27.90 in$^2$. The relatively larger windows 108, when compared to the opening 44 of the prior art, contribute to enabling these larger flow areas.

In contrast with the exemplary embodiment of FIG. 5 detailed above, in this exemplary embodiment of FIG. 6 there is no optional ramp 188 at the perimeter 186 of the pallet 170. Instead, as shown on the right side, there may be no feature on the sealing side 174, radially outward of the sealing area 200. Alternately, as shown on the left side, the sealing surface near the perimeter may slope upward with respect do a direction of travel of escaping gases, forming an upwardly sloped surface feature 262. This is intended to permit escaping gases to flow radially upward earlier in the lateral portion 216 of the vent flow path 212, thereby reducing further the amount of turning necessary. This may reduce an amount of upward force on the exposed surface 182 of the pallet 170, but the advanced spring design makes this possible while still maintaining at least the minimum flow rate required.

The pallet 170 may optionally include a receptacle 270 configured to receive an insertion end 272 of a tool 274 that is inserted through a tool aperture 276 in the upper housing 104. The insertion end 272 may interlock with the receptacle 270 via an interlocking arrangement 278 such as male threads on the insertion end 272 and female threads in the receptacle 270. An example of an appropriate thread is ¾×10. A height adjustment mechanism. 280 may be configured to move the tool 274, and hence the pallet 170, against the bias of the biasing arrangement 116. The height adjustment mechanism 280 may be a nut 282 that rests against a top surface 284 of the upper housing 104, or alternately, against a washer 286 disposed between the nut 282 and the top surface 284, and an engagement thread 288 appropriately positioned on the tool 274. An example of an appropriate nut is an Acme nut that engages a 1.5 inch Acme thread on the tool 274. The nut 282 may be turned while the tool 274 is prevented from rotating. This will lift the tool 274 and with it the pallet 170. Once sufficiently lifted, the windows 108 are sized to enable an operator to remove the gasket 176 and replace with a new one as necessary. A locking feature (not shown) such as, for example, a locking pin, may be added to block downward movement of the retracted pallet 170, thereby ensuring the operator's safety.

Figure 7:
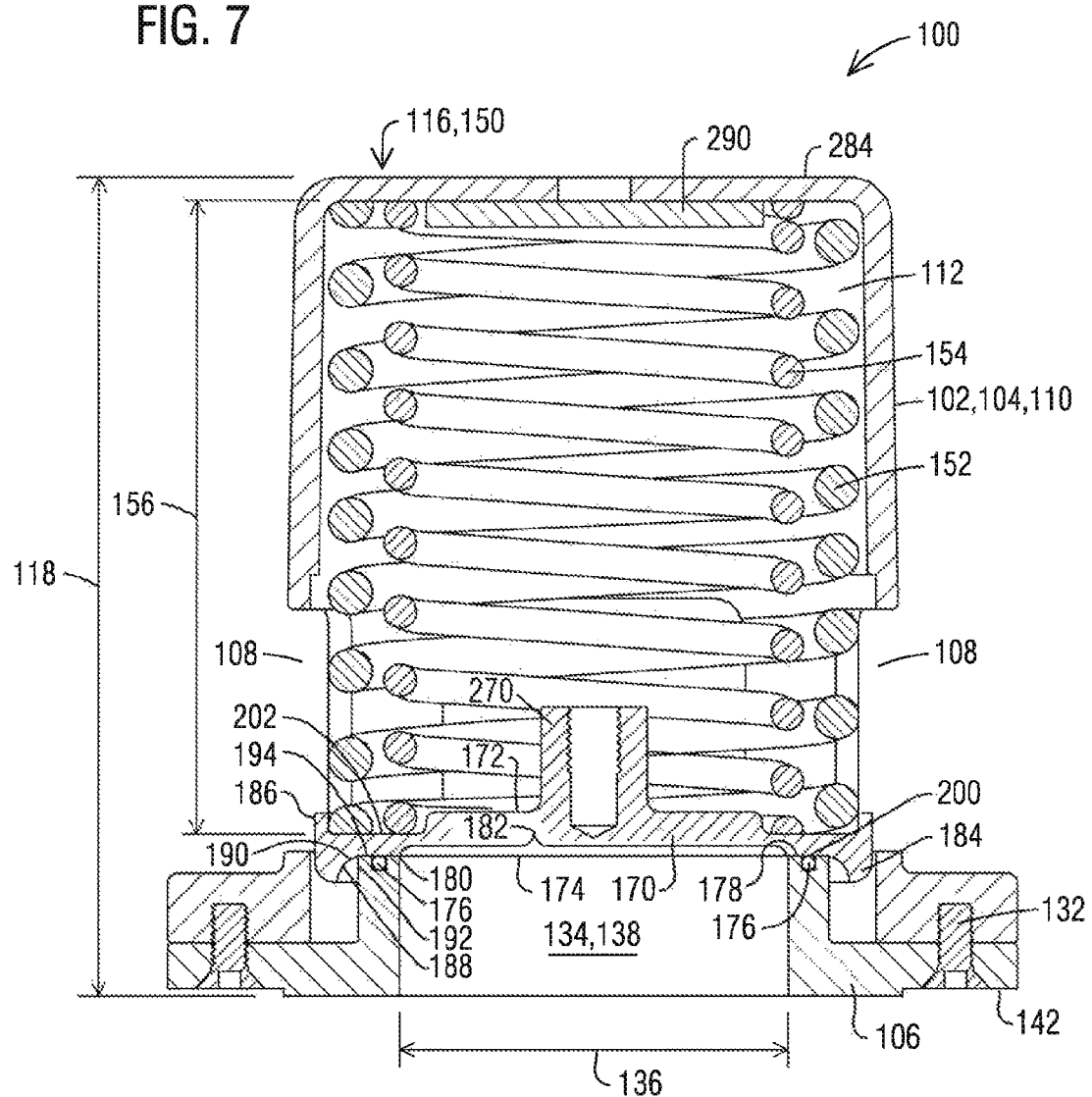
FIG. 7 shows an alternate exemplary embodiment of the pressure relief valve.

FIG. 7 shows an alternate exemplary embodiment of the pressure relief valve 100 that uses a centering plate 290 instead of an alignment device 158, should the cost savings be deemed more desirable than any gained benefit.

Figure 8:
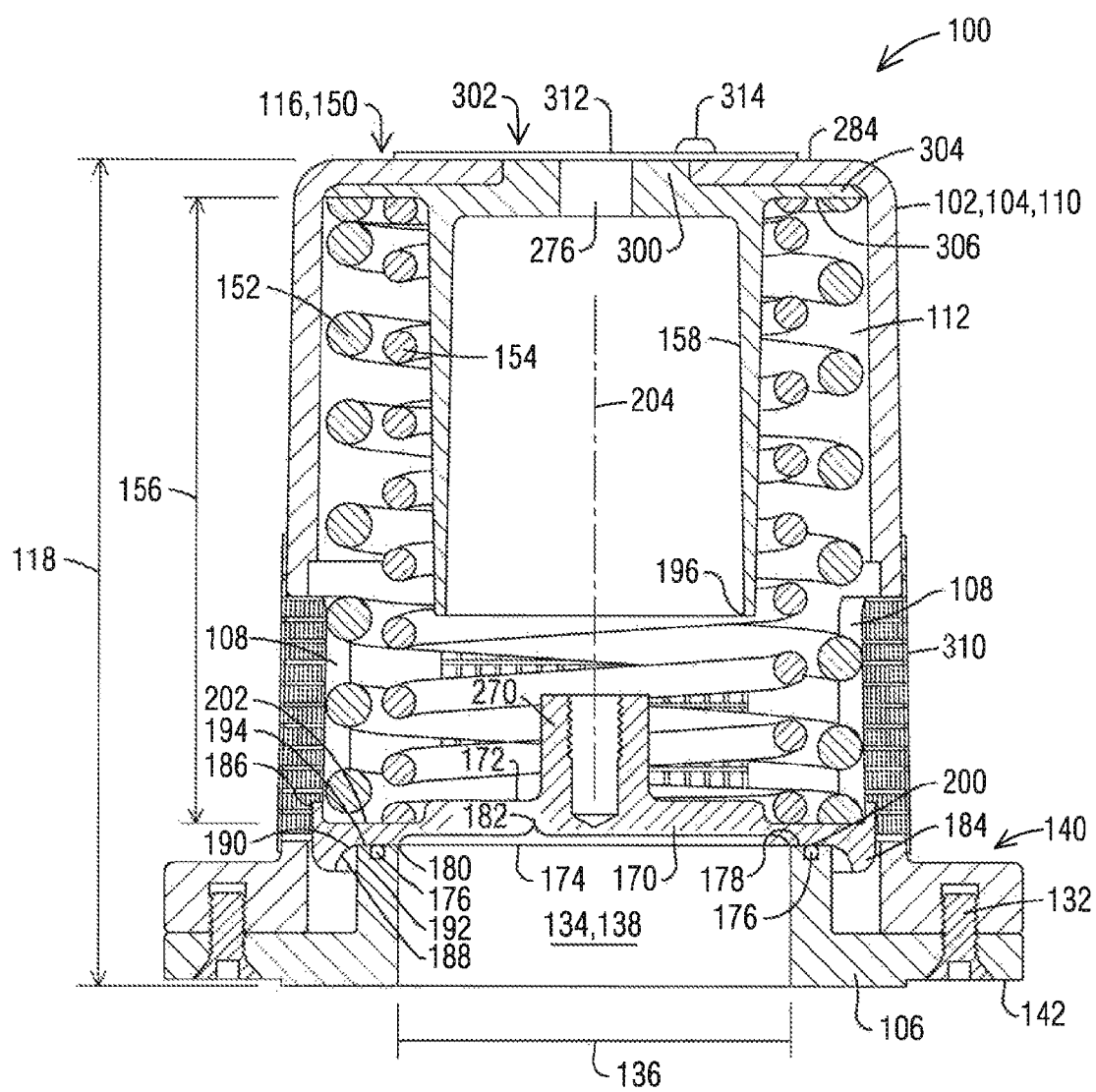
FIG. 8 shows an alternate exemplary embodiment of the pressure relief valve.

FIG. 8 shows an alternate exemplary embodiment of the pressure relief valve 100. In this exemplary embodiment the alignment device 158 is configured differently, and includes a positioning feature 300 configured to cooperate with an positioning feature recess 302 in the upper housing 104 that together center the alignment device 158 within the housing 102. The alignment device 158 may also include a positioning feature ledge 304 having a ledge surface 306 on which the springs 152, 154 may press. The bias of the springs 152, 154 urges the positioning feature 300 into the positioning feature recess 302, thereby securing the alignment device 158 in position. This, in turn, helps keep the springs 152, 154 properly aligned during the opening and closing strokes. An optional screen 310 may be secured over the windows 108 to keep debris and/or small wildlife out. In addition, the screen 310 may further increase the tamper resistance of the pressure relief valve 100 by preventing access to the interior of the pressure relief valve 100. These benefits might be found sufficiently beneficial to overcome any friction and associated reduction in the flow rate introduced into the escaping flow. There may optionally be a tool aperture cover 312 secured over the tool aperture 276 via a miscellaneous fastener 314 to prevent debris and/or small wildlife from entering through the tool aperture 276 and to increase the tamper resistance of the pressure relief valve 100.

Figure 9:
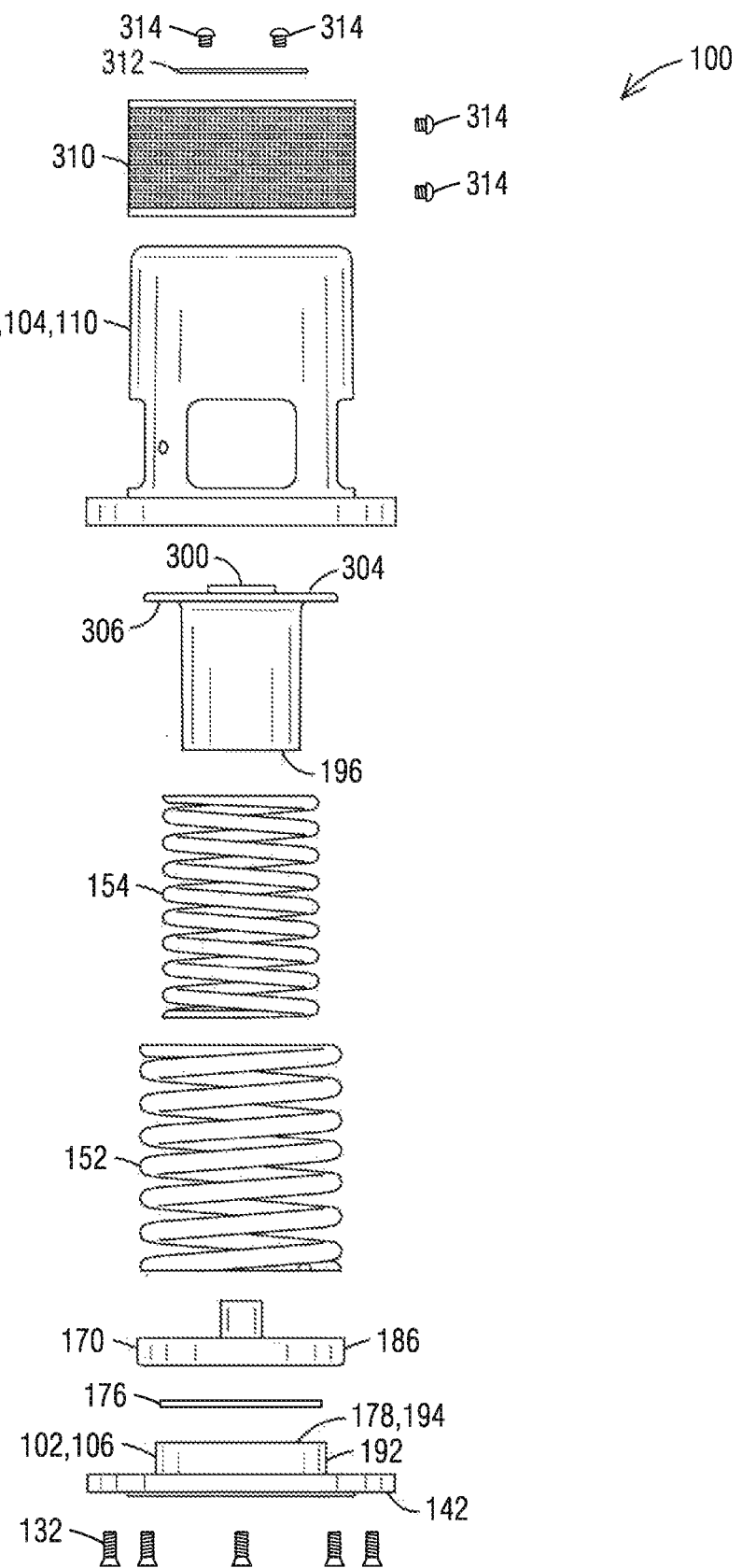
FIG. 9 shows an exploded view of the pressure relief valve of FIG. 8.

FIG. 9 is an exploded view of the pressure relief valve 100 of FIG. 8, showing the screen 310, the tool aperture cover, and the associated miscellaneous fasteners 314. Also visible are the positioning feature ledge 304 and the ledge surface 306 on the alignment device 158.

From the foregoing it can be seen that the inventors have devised an improved pressure relief valve by recognizing a major flow rate impediment and taking steps to eliminate it that were contrary to conventional practice. Consequently, this represents an improvement in the art.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A pressure relief valve for a railroad tank car, comprising:
   an upper housing defining a housing internal chamber and comprising at least one window between the housing internal chamber and atmosphere;
   a lower housing operatively associated with the upper housing and comprising a housing opening;
   a pallet disposed within the housing internal chamber; and
   a pair of nested springs disposed within the housing internal chamber and configured to bias the pallet toward the lower housing and thereby form a seal between the housing opening and the housing internal chamber when a pressure in the housing opening is below a start-to-discharge pressure,
   wherein when the pressure in the housing opening is at a full discharge pressure that is greater than and within fourteen percent of the start-to-discharge pressure, the pair of nested springs is configured to permit the pallet to travel a sufficient distance to expose a flow area of the at least one window that is at least greater than a flow area of the housing opening.

2. The pressure relief valve of claim 1, wherein the upper housing comprises a cylindrical shape, wherein the pair of nested springs comprises an inner and an outer spring, and wherein the upper housing provides lateral support to an entire length of the outer spring when the pallet forms the seal.

3. The pressure relief valve of claim 1, further comprising a cylindrically-shaped alignment device configured to provide lateral support to an inner spring of the pair of nested springs.

4. The pressure relief valve of claim 2, wherein the pallet comprises an annular shaped sealing area that forms the seal, and wherein at least one spring of the pair of nested springs rests on an opposite side of the pallet and radially outward of the annular shaped sealing area with respect to an axis of travel of the pallet.

5. The pressure relief valve of claim 1, wherein the pallet comprises a sealing area on a sealing side of the pallet, and wherein the pallet comprises no surfaces radially outward of the sealing area that are effective to redirect escaping gases downward and generate a reactive force that acts against the bias of the pair of nested springs.

6. The pressure relief valve of claim 1, wherein the pallet comprises a sealing area on a sealing side of the pallet, and wherein with respect to a direction of flow of escaping gases the pallet comprises an upwardly sloped surface disposed radially outward of the sealing area.

7. The pressure relief valve of claim 1, wherein the pallet further comprises a receptacle configured to receive a tool, wherein the upper housing comprises a tool aperture, and wherein the receptacle and the tool aperture are configured to receive the tool through the tool aperture and into the receptacle such that the tool can be used to move the pallet against the bias of the pair of nested springs and be supported by the upper housing.

8. The pressure relief valve of claim 1, wherein the flow area of the at least one window is at least fifteen (15) percent greater than the flow area of the housing opening.

9. The pressure relief valve of claim 1, wherein the pressure relief valve is effective to produce a discharge coefficient of at least 0.92.

10. A pressure relief valve for a railroad tank car, comprising
    a housing defining a housing internal chamber and comprising a wall, at least one window through the wall of the housing and providing fluid communication between the housing internal chamber and the atmosphere, and a housing opening;
    a pallet; and
    a biasing arrangement disposed within the housing internal chamber and configured to bias the pallet toward the housing opening and thereby form a seal between the housing opening and the housing internal chamber,
    wherein when a pressure in the housing opening is at a full discharge pressure that is greater than and within fourteen percent of a start-to-discharge pressure, the biasing arrangement is configured to permit the pallet to travel into the housing internal chamber a sufficient distance to form a vent path between the housing opening and the atmosphere,
    wherein a lateral portion of a vent path spans from a perimeter of the housing opening to a circumference defined by an outer surface of the housing, and
    wherein at the full discharge pressure a ratio of a height of the lateral portion of the vent path to a length of the lateral portion of the vent path is at least 0.92:1.

11. The pressure relief valve of claim 10, wherein the pallet comprises a sealing area on a sealing side of the pallet, and wherein the pallet comprises no surfaces radially outward of the sealing area that are effective to redirect escaping gases and generate a reactive force that acts against the bias of the biasing arrangement.

12. The pressure relief valve of claim 10, wherein a sealing side of the pallet comprises a feature that permits vertically upward travel of escaping gases as the escaping gases exit the vent path.

13. The pressure relief valve of claim 10, wherein the biasing arrangement comprises a pair of nested springs that exhibit a linear spring constant throughout the travel into the housing internal chamber at least until the vent path is formed.

14. The pressure relief valve of claim 10, wherein the housing provides lateral support along an entire length of the biasing arrangement when the pallet forms the seal.

15. The pressure relief valve of claim 10, further comprising an alignment device configured to provide lateral support to the biasing arrangement.

16. The pressure relief valve of claim 15, wherein the alignment device provides a positive stop to an upper end of a stroke of the pallet.

17. The pressure relief valve of claim 10, wherein the vent path is effective to produce a discharge coefficient of at least 0.92.

18. The pressure relief valve of claim 10, wherein the lateral portion comprises a lateral portion length that is not greater than twenty five percent of a diameter of the housing opening.

19. The pressure relief valve of claim 18, wherein the full discharge pressure the ratio of the height of the lateral portion to the length of the lateral portion is at least 1.06:1.

20. The pressure relief valve of claim 10, the vent path comprising a vent path exit having an exit area defined by an arc length of the at least one window multiplied by the height of the lateral portion of the vent path, wherein at the full discharge pressure the exit area is at least fifteen (15) percent greater than a flow area of the housing opening.

* * * * *